Patented Dec. 14, 1948

2,456,243

UNITED STATES PATENT OFFICE 2,456,243

EMULSION POLYMERIZATION OF 2-CHLO-RO - 1,3 - BUTADIENE IN THE PRESENCE OF TETRAALKYL - DIAMINO - DIPHENYL - METHANES

Robert S. Barrows, Claymont, Del., assignor to E. I. du Pont de Nemours & Company, Wilmington, Del., a corporation of Delaware No Drawing. Application April 2, 1946, Serial No. 659,155

10 Claims. (Cl. 260—92.7)

1

This invention relates to a process for producing improved 1,3-diene polymers, and has for its object to provide a process for producing rubber-like polymers of 2-chloro-1,3-butadiene and copolymers of the same with 1,3-butadiene hydrocarbons, such as butadiene-1,3 and isoprene, which have improved stability with regard to aging and which, on vulcanization, have improved properties, more particularly tensile strength. A further object of the invention is to provide a process in which the rate of polymerization is accelerated by the addition of tetraalkyl-p,p'-diamino-diphenyl methanes.

I have found that, where 2-chloro-1,3-butadiene or a mixture of 2-chloro-1,3-butadiene with 1,3-butadiene hydrocarbons, and more particularly 1,3-butadiene or isoprene, are polymerized in an emulsion under alkaline conditions in the presence of a tetraalkyl-p,p'-diamino-diphenyl methane, the resulting polymers exhibit improved stability against aging and the vulcanizates of such polymers exhibit greatly improved tensile strength and elongation. The invention is particularly suitable for the preparation of latices from which films of the elastomer are to be produced.

The tetraalkyl-p,p'-diamino-diphenyl methanes have the formula:

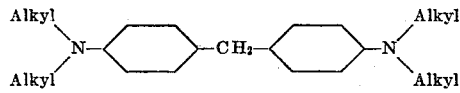

Where the polymerization is carried out in an emulsion having a pH above 7, the tetraalkyl-p,p'-diamino-diphenyl methanes operate as polymerization accelerators, particularly in the copolymerization of the 2-chloro-1,3-butadiene with isoprene or 1,3-butadiene, but, in all cases, the resulting rubber-like polymers exhibit improved stability and, on vulcanization, exhibit improved tensile strength.

The present invention is particularly applicable to the polymerization of 2-chloro-1,3-butadiene (chloroprene), either alone or in admixture with up to 60% of a 1,3-diene hydrocarbon, such as 1,3-butadiene or styrene, in emulsion systems having a pH of from 9 to 13.

The tetraalkyl - p,p' - diamino-diphenyl methanes may be used in an amount ranging from 0.1% to 2.0%, based on the weight of the polymerizable materials, although it will be found that about 1.0% is preferred. These tetraalkyl-diamino-diphenyl methanes may be employed together with mercaptans if desired, in which case the mercaptan will usually be employed in an

2 amount of from 0.01% to 0.2%, based on the weight of the polymerizable materials. The use of from 0.075% of pinene mercaptan together with the tetraalkyl-diamino-diphenyl methane has been found to give very desirable results where a mercaptan is employed. Other mercaptans, such as lorol mercaptan and the like, may be employed.

The tetraalkyl - p,p' - diamino-diphenyl methanes particularly suitable for use in the present invention are those in which the alkyl groups contain not more than 4 carbon atoms. The tetramethyl-, tetraethyl-, tetrapropyl- or tetrabutyl-p,p'-diamino-diphenyl methanes may be used in this invention, as more particularly illustrated by the following examples, in which the parts used are by weight, unless otherwise specified.

*Example 1*

A solution of 0.35 gram of sodium hydroxide, 0.22 gram of the sodium salt of the condensation product of formaldehyde and naphthalene sulfonic acids, and 0.22 gram of potassium persulfate ($K_2S_2O_8$) in 58 cc. of water, was introduced into a glass pressure tube and cooled to 0° C. A solution of 0.4 gram of tetramethyl-p,p'-diamino-diphenyl methane, 1.6 grams of Nancy wood rosin and 0.20 gram of pinene mercaptan in 30 grams of 2-chloro-1,3-butadiene and 10 grams of 1,3-butadiene was added. (The pH of this emulsion was between 10 and 13). The tube was stoppered and enclosed in a metal guard. Polymerization was carried out while rotating the tube in a 40° C. water bath for 7 hours. The tube was then opened and the excess butadiene allowed to blow off. The latex was stabilized with a mixture of 0.22 gram of phenyl-alpha-napthylamine and 0.18 gram of diphenylamine (which had been melted together and dispersed in 8 cc. of water with the help of a small amount of sulfated oleyl acetate as the dispersing agent). The latex was made acid to litmus paper with 10% acetic acid and coagulated with sodium chloride brine. The polymer was washed with water on a corrugated rubber mill and then milled to dryness on a smooth mill. 32 grams of a plastic rubber-like polymer was obtained. It required 8 hours of polymerization to equal this yield in the absence of the tetramethyl-p,p'-diamino-diphenyl methane.

100 parts of the polymer made in this example were compounded with 1 part of stearic acid, 2 parts of phenyl-alpha-naphthylamine, 40 parts of medium process channel black, 4 parts of magnesium oxide, 5 parts of zinc oxide, 2 parts of sulfur and 1 part of an accelerator prepared by fusing together equal weights of diphenyl guanidine and the zinc salt of mercapto-benzothiazole. This stock, when cured for 40 minutes at 287° F., gave a tensile strength of 3750 p. s. i. and an elongation at break of 400%. In comparison, a polymer prepared in the same way except that the tetramethyl-diamino-diphenyl methane was absent, gave a tensile strength of only 2400 pounds and an elongation of 300% when compounded and cured in the same way.

*Example 2*

A solution of 4 grams of Nancy wood rosin, and 0.5 gram of tetramethyl-p,p'-diamino-diphenyl methane in 100 grams of 2-chloro-1,3-butadiene, was added with agitation to a solution of 1.05 grams of sodium hydroxide and 0.2 gram of potassium persulfate in 96 grams of water. To this emulsion 2.0 grams of a 10% aqueous solution of potassium ferricyanide was added during polymerization as a polymerization catalyst. The emulsion was polymerized at 40° C. for 2 hours and 15 minutes. At the end of this time, essentially all of the monomeric chloroprene had been converted to polymer. (The initial pH of this emulsion was about 12.5.)

This latex was compared, as shown in the following table, with the latex made in the same way except that the tetramethyl-diamino-diphenyl methane was omitted. In comparing these latices, each was compounded according to the formula given in the table, and then made into film whose physical properties were determined as indicated in the table. In compounding the latices, each of the solid ingredients was added to the polymer emulsion as a dispersion made by grinding it in a ball mill with an equal weight of an aqueous solution containing 3% of ammonium caseinate and 1% of the sodium salts of the condensation product of formaldehyde and naphthalene sulfonic acids.

*Comparison of dip films from latex modified with 0.5% tetramethyl-p,p'-diamino diphenyl methane and from unmodified latex*

| | Latex made with 0.5% tetramethyl-p,p'-diaminodiphenyl methane present during polymerization as a modifier. | No modifier |
|---|---|---|
| Latex compounds based on 100 parts of polymer— hard clay 10 parts, ZnO 5 parts, phenyl-beta-naphthylamine 2 parts. Dip films cured 30 minutes at 140° C. | | |
| Stress at 600% elongation | 1,000 | 1,300 |
| Tensile strength | 3,125 | 2,675 |
| Elongation at break | 890 | 765 |
| Compound—Lithopone 10 parts, ZnO 5 parts, 2 parts of a 45% solution of sodium dibutyl dithiocarbamate in water. Dip films cured 30 minutes at 140° C. | | |
| Stress at 600% elongation | 1,325 | 550 |
| Tensile strength | 3,150 | 2,050 |
| Elongation at break | 800 | 690 |

This invention is useful in that 2-chloro-1,3-butadiene polymers and copolymers with hydrocarbon dienes with improved stability and improved vulcanizate properties may be obtained, such as higher tensile strength and greater resilience.

I claim:

1. In the process for effecting emulsion polymerization compounds of the class consisting of 2-chloro-1,3-butadiene and mixtures of 2-chloro-1,3-butadiene with up to 60% of a 1,3-butadiene hydrocarbon in which the polymerization is carried out under alkaline conditions, the step which comprises effecting the polymerization in the presence of from 0.1% to 2%, based on the weight of the polymerizable material, of a tetraalkyl-p,p'-diamino-diphenyl methane in which each of the alkyl groups contains from 1 to 4 carbon atoms.

2. In the process for effecting emulsion polymerization compounds of the class consisting of 2-chloro-1,3-butadiene and mixtures of 2-chloro-1,3-butadiene with up to 60% of a 1,3-butadiene hydrocarbon in which the polymerization is carried out under alkaline conditions, the step which comprises effecting the polymerization in the presence of from 0.1% to 2%, based on the weight of the polymerizable material, of tetramethyl-p,p'-diamino-diphenyl methane.

3. In the process of effecting emulsion polymerization of a mixture of 2-chloro-1,3-butadiene with up to 60% of isoprene in which the polymerization is carried out under alkaline conditions, the step which comprises effecting the polymerization in the presence of from 0.1% to 2%, based on the weight of the polymerizable material, of a tetraalkyl-p,p'-diamino-diphenyl methane in which each of the alkyl groups contains from 1 to 4 carbon atoms.

4. In the process of effecting emulsion polymerization of a mixture of 2-chloro-1,3-butadiene with up to 60% of isoprene in which the polymerization is carried out under alkaline conditions, the step which comprises effecting the polymerization in the presence of from 0.1% to 2%, based on the weight of the polymerizable material, of tetramethyl-p,p'-diamino-diphenyl methane.

5. In the process for effecting emulsion polymerization of 2-chloro-1,3-butadiene in which the polymerization is carried out under alkaline conditions, the step which comprises effecting the polymerization in the presence of from 0.1% to 2%, based on the weight of the 2-chloro-1,3-butadiene, of tetramethyl-p,p'-diamino-diphenyl methane.

6. Rubber-like materials of the class consisting of polymers of 2-chloro-1,3-butadiene and copolymers of 2-chloro-1,3-butadiene with up to 60% of a 1,3-butadiene hydrocarbon obtained by the process of claim 1.

7. Rubber-like materials of the class consisting of polymers of 2-chloro-1,3-butadiene and copolymers of 2-chloro-1,3-butadiene with up to 60% of a 1,3-butadiene hydrocarbon obtained by the process of claim 2.

8. Rubber-like copolymers of 2-chloro-1,3-butadiene and isoprene obtained by the process of claim 3.

9. Rubber-like copolymers of 2-chloro-1,3-butadiene and isoprene obtained by the process of claim 4.

10. Rubber-like polymers of 2-chloro-1,3-butadiene obtained by the process of claim 5.

ROBERT S. BARROWS.

REFERENCES CITED

The following references are of record in the file of this patent:

UNITED STATES PATENTS

| Number | Name | Date |
|---|---|---|
| 1,954,377 | Calcott | Apr. 10, 1934 |
| 2,259,122 | Walker | Oct. 14, 1941 |

OTHER REFERENCES

"Duprene," Rubber Age, Dec. 10, 1931, page 218.